United States Patent [19]

Tadenuma et al.

[11] Patent Number: 5,710,871
[45] Date of Patent: Jan. 20, 1998

[54] DATA CORRECTION SUBSYSTEM AND METHOD FOR COLOR IMAGE PROCESSING SYSTEM

[75] Inventors: Hironobu Tadenuma; Shuichi Ichinose, both of Nagano, Japan

[73] Assignee: Seiko Epson Corporation, Tokyo, Japan

[21] Appl. No.: 403,442

[22] Filed: Mar. 14, 1995

[30] Foreign Application Priority Data

Mar. 15, 1994 [JP] Japan ......................... 6-44143

[51] Int. Cl.[6] .................. G06K 15/00; G03F 3/08
[52] U.S. Cl. .................. 395/109; 358/518; 358/519
[58] Field of Search ........................ 358/518–520, 358/515, 523, 525, 504; 395/109, 101

[56] References Cited

U.S. PATENT DOCUMENTS

| | | | |
|---|---|---|---|
| 4,500,919 | 2/1985 | Schreiber | 358/518 |
| 4,926,254 | 5/1990 | Naktsuka et al. | 358/519 |
| 4,929,978 | 5/1990 | Kanamori et al. | 355/38 |
| 5,105,267 | 4/1992 | Hayashi | 358/519 |
| 5,107,332 | 4/1992 | Chan | 358/518 |
| 5,146,328 | 9/1992 | Yamasaki et al. | 358/519 |
| 5,185,673 | 2/1993 | Sobol | 395/109 |
| 5,408,342 | 4/1995 | Kumada et al. | 358/518 |

FOREIGN PATENT DOCUMENTS

| | | |
|---|---|---|
| 0 405 470 A2 | 1/1991 | European Pat. Off. . |
| 3-76471 | 4/1991 | Japan . |
| 5-122513 | 5/1993 | Japan . |
| 5-183740 | 7/1993 | Japan . |
| WO 92/04803 | 3/1992 | WIPO . |

*Primary Examiner*—Dwayne Bost
*Assistant Examiner*—Tracy M. Legree
*Attorney, Agent, or Firm*—Morgan, Lewis and Bockius LLP

[57] ABSTRACT

A data correction subsystem for a color image processing system having a color image reading device and a color image printing device. A chart file is transmitted to the printing device so that the printing device produces a sample chart. Calibration data is calculated from read sample data so that the read sample data can be corrected to corresponding data in the chart file. The read sample data is obtained by causing the reading device to read the sample chart. Printing data to be transmitted to the printing device is corrected using the calibration data.

18 Claims, 12 Drawing Sheets

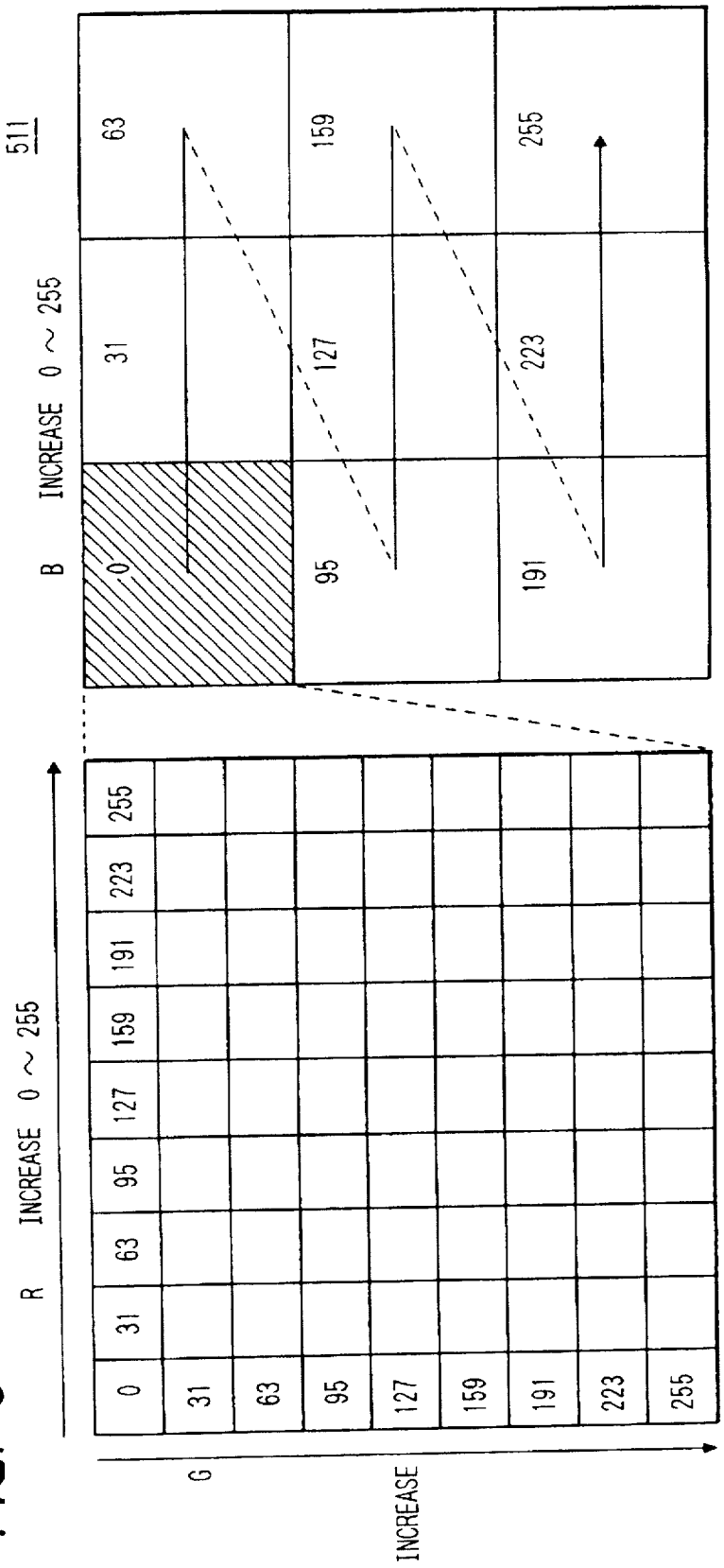

FIG. 11

AFTER DATA SAMPLING

| CHART FILE DATA | R,G,B | 0 | 7 | 15 | 23 | 31 | 39 | 47 | 55 | 63 | 71 | ...... | 255 |
|---|---|---|---|---|---|---|---|---|---|---|---|---|---|
| SAMPLE CHART READ DATA | R | 17 | 18 | 18 | 20 | 22 | 24 | 25 | 28 | 30 | 34 | ...... | 250 |
| | G | 16 | 17 | 17 | 18 | 19 | 21 | 22 | 25 | 27 | 30 | ...... | 236 |
| | B | 16 | 17 | 18 | 19 | 20 | 22 | 23 | 26 | 28 | 31 | ...... | 230 |

8-14 ARE CALCURATED BY LINEAR INTERPOLATION

AFTER LINEAR INTERPOLATION

| CHART FILE DATA | R,G,B | ...... | 7 | 8 | 9 | 10 | 11 | 12 | 13 | 14 | 15 | ...... | 255 |
|---|---|---|---|---|---|---|---|---|---|---|---|---|---|
| SAMPLE CHART READ DATA | R | ...... | 18 | 18 | 18 | 18 | 18 | 18 | 18 | 18 | 18 | ...... | 250 |
| | G | ...... | 17 | 17 | 17 | 17 | 17 | 17 | 17 | 17 | 17 | ...... | 236 |
| | B | ...... | 17 | 17 | 17 | 17 | 18 | 18 | 18 | 18 | 18 | ...... | 230 |

FIG. 13

GRAY SCALE READ DATA

| 0 | 0 | 0 | 0 | 0 | 0 | 0 | 0 | 0 | 1 |   |
|---|---|---|---|---|---|---|---|---|---|---|
| 1 | 1 | 1 | 1 | 1 | 1 | 1 | 1 | 1 | 2 |   |
| 3 | 3 | 3 | 3 | 4 | 4 | 4 | 4 | 5 | 5 |   |
| 5 | 5 | 6 | 6 | 6 | 6 | 7 | 7 | 7 | 7 |   |
| 7 | 7 | 8 | 8 | 8 | 8 | 9 | 9 | 9 | 9 | ... 250 |

GRAY SCALE DATA OF CHART FILE

| 0 | 1 | 2 | 3 | 4 | 5 | 6 | 7 | 8 | 9 |   |
|---|---|---|---|---|---|---|---|---|---|---|
| 10 | 11 | 12 | 13 | 14 | 15 | 16 | 17 | 18 | 19 |   |
| 20 | 21 | 22 | 23 | 24 | 25 | 26 | 27 | 28 | 29 |   |
| 30 | 31 | 32 | 33 | 34 | 35 | 36 | 37 | 38 | 39 |   |
| 40 | 41 | 42 | 43 | 44 | 45 | 46 | 47 | 48 | 49 | ... 255 |

FIG. 14

PRINTER CALIBRAION γ CURVE FILE (TABLE)

| INPUT | 0 | 1 | 2 | 3 | 4 | 5 | 6 | 7 | 8 | 9 | ... | 255 |
|---|---|---|---|---|---|---|---|---|---|---|---|---|
| OUTPUT | 0 | 7 | 17 | 20 | 24 | 28 | 32 | 36 | 42 | 57 | ... | 255 |

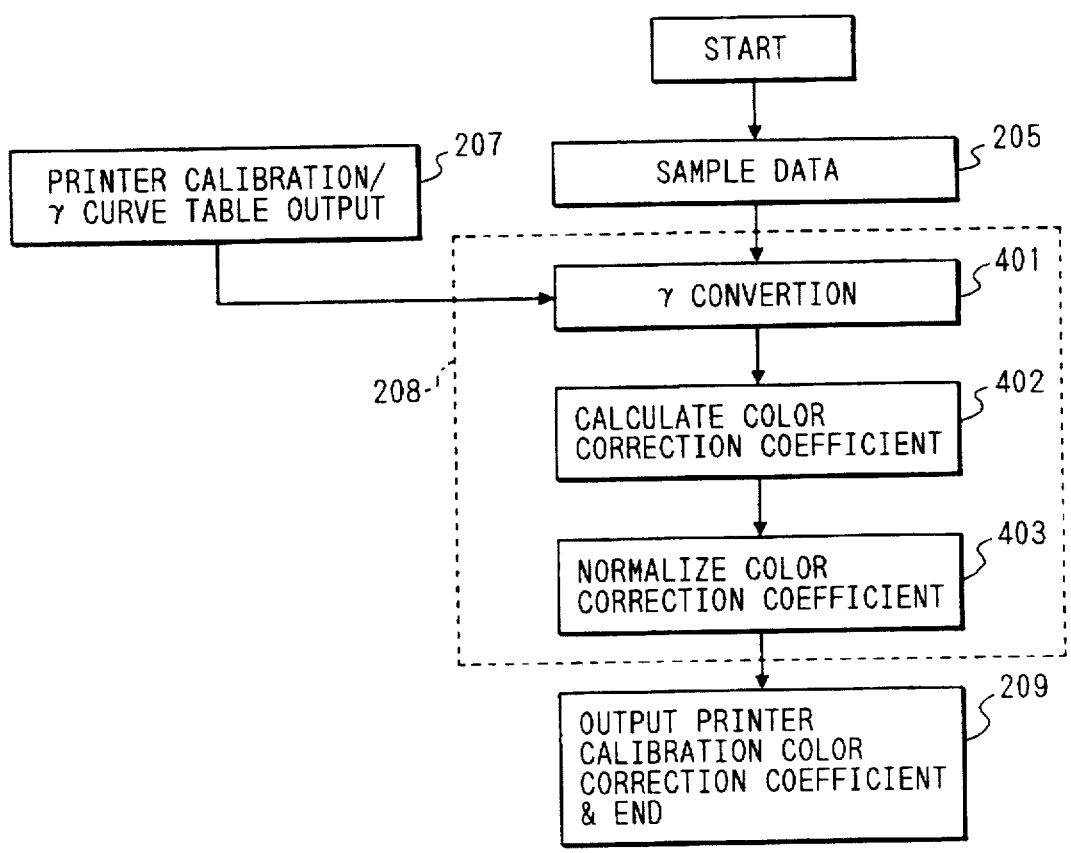

DATA CORRECTION SUBSYSTEM AND METHOD FOR COLOR IMAGE PROCESSING SYSTEM

BACKGROUND OF THE INVENTION

1. Field of the Invention

The present invention relates to a data correction subsystem and method for improving the gray density and color reproduction of a color image processing system, such as a computer image processing device, a copying device, or a facsimile transmission system.

2. Discussion of the Related Art

A typical color image processing system comprises an image reading device, such as an image scanner, for producing image data from an original image, a host computer for processing the image data, and a color printer for printing out images in response to the processed image data. One of the problems encountered by such a system is that the gray density and color of the original image are not faithfully reproduced.

A major reason for this problem is the discrepancy between the input/output characteristic of the image reading device and the input/output characteristic of the printer. Specifically, a nonlinear input characteristic is generally observed in any type of device. While the input characteristic of the image reading device is generally relatively linear, that of the printer is relatively nonlinear. As a result, the gray density and colors of the original image are not faithfully reproduced. Further, the printer cannot reproduce the entire density range of the original image and, in particular, cannot reproduce extremely high density regions. This is also one of the causes of impaired gray density and color reproduction.

SUMMARY OF THE INVENTION

The present invention has been made in view of the above circumstances and has as an object to provide a data correction subsystem which allows faithful reproduction of an original image even if there is a discrepancy between the input/output characteristic of an image reading device and that of a printer in a color image processing system.

Another object of the invention is to provide a data correction subsystem which allows faithful reproduction of an original image even if the printable density range is limited in the data correction subsystem.

Still another object of the invention is to provide a simple processing procedure for executing data correction processing using a computer.

Yet another object of the invention is to provide a color image processing system having a flexible configuration.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a data correction subsystem for a color image processing system having a color image reading device and a color image printing device is provided, comprising: transmitting means for transmitting a chart file to the printing device so that the printing device produces a sample chart; calibration data calculation means for calculating calibration data from read sample data so that the read sample data can be corrected to corresponding data in the chart file, the read sample data being obtained by causing the reading device to read the sample chart; and calibration means for correcting printing data to be transmitted to the printing device using the calibration data.

In a preferred embodiment, the calibration data includes $\gamma$ calibration data for correcting gray density and color calibration data for correcting a color. The $\gamma$ calibration data is, e.g., a conversion table for converting an inputted gray density value to another density value and outputting the converted density value. The color calibration data is, e.g., a 3×3 matrix filter by which three primary color components that indicate a color are multiplied. To correct printing data, the printing data is subjected first to gray density correction with the $\gamma$ calibration data and then to color correction with the color calibration data.

The color image processing system is constructed of a printing device, an image reading device, and a computer. Preferably, the calibration means is disposed within the reading device so that correction is made only to image data produced by the reading device. However, the system may be modified such that all data to be sent to the printing device can be corrected, whether or not the data is the image data produced by the reading device, by providing the calibration means within the computer. Further, in the case where a plurality of types of printing devices can be used selectively or concurrently as the printing device, calibration data respectively dedicated to such a plurality of usable types of printing devices may be calculated and saved in advance, so that calibration data to be used for correction may be selected in accordance with the type of printing devices actually used.

To calculate the $\gamma$ calibration data, first, the read sample data is subjected to normalization processing to expand a gray density distribution region toward a higher density side. Then, a point of change in a density value is detected by scanning gray density values of the normalized read sample data. Conversion data for converting the gray density value of the read sample data at the detected point of change into a gray density value of the chart file data corresponding to the point of change is prepared, and the prepared conversion data is made into the $\gamma$ calibration data.

To calculate the color calibration data, first, only color data in the chart file is sampled from the read sample data, the color data corresponding to a predetermined color within a range of colors that can be outputted by the printing device. Then, a 3×3 matrix filter is used to minimize an error between the sampled color data and the corresponding color data in the chart file. Normalization processing is thereafter executed to make lightness components with respect to the three primary colors of the calculated matrix filter equal to one another, and the thus normalized matrix filter is made the color calibration data. It may be noted that better results could be obtained, in some cases, by sampling only color data corresponding to a predetermined color outside the range of colors that can be outputted by the printer in the aforementioned sampling operation.

The system first gives a predetermined chart file to the printing device and prints out a sample chart described by the chart file. The sample chart reflects the input/output characteristic of the printing device. Then, the sample chart is read by the reading device. Data obtained by causing the reading device to read the sample chart reflects the input/output characteristic of the reading device superimposed upon the input/output characteristic of the printing device (since the input/output characteristic of the reading device is almost linear, it is the input/output characteristic of the printing device that is substantially reflected). Then, calibration data is calculated from the read data, the calibration data being such as to correct the read data to the original chart file data.

In this way, the calibration data becomes conversion data that has a substantially inverse characteristic with respect to the input/output characteristic of the printing device. Printing data will thereafter be corrected using the calibration data, and the corrected data will then be sent to the printing device. As a result, the correction made by the calibration data cancels out the input/output characteristic of the printing device, which in turn allows an image having faithful color and gray density reproduction to be printed out.

Further, since the calibration data conforms to the input/output characteristic of a printing device that is actually used, the best correction specific to the printing device can be implemented. In addition, the calibration data is freely changed in accordance with the type of printing device. Some conventional examples (e.g., Unexamined Japanese Patent Publications Nos. Hei. 3-76471 and Hei. 5-183740) are designed so that appropriate calibration data is selected from a calibration data set prepared in a ROM in advance. However, compared with such conventional examples, the subsystem of the invention can provide a higher degree of freedom in handling optimization of correction and change of the printing device. In addition, while the aforementioned two conventional examples employ the sample chart that has been prepared in advance, the subsystem of the invention is characterized as using a printout obtained by giving data to a printing device, which means that the subsystem can cover all colors that are to be possibly printed without being limited by the color range specified in the sample chart that has been prepared in advance. Hence, the subsystem of the invention is applicable to future printing devices.

Still further, the subsystem of the invention may function as a measuring instrument that measures the γ characteristic and color correction coefficient of a printing device if the calculated calibration data is made usable independently of the calibration means.

A system formed of a printing device, a reading device, and a computer such as an embodiment that will be described below can incorporate the calibration means in the reading device, in the computer, or in the printing device. If the calibration means is located in the reading device, there is an advantage that printing device changes and computer application software changes that take place relatively frequently can be handled with ease. On the other hand, if the calibration means is located in the computer, there are a plurality of advantages: printer changes can be handled with ease; application changes can be handled if located in the operating system of the computer; and data inputted through means other than the reading device can also be corrected. The third advantage is also provided when the calibration means is located in the printing device.

Since a system that frequently prints out data inputted through means other than the image reading device connected thereto such as a copying machine and a facsimile transmission/reception system, each serving also as a printer, can particularly enjoy the aforementioned three advantages, it is preferred that the calibration means be located in a component other than the reading device in this type of system.

A system that can use a plurality of types of printing devices selectively or concurrently can enjoy an advantage that the subsystem of the invention is freely applicable to any type of printer as long as calibration data dedicated to each of a plurality of printers is saved in the system and appropriate calibration data is selected from the saved calibration data in accordance with the type of printing device actually used.

In the subsystem of the invention, if γ calibration data for gray density correction and color calibration data for color correction are prepared as calibration data, and printing data is subjected first to gray density correction with the γ calibration data and then to color correction with the color calibration data, then satisfactory gray density and color reproduction may, in some cases, be obtained only through relatively simple color correction processing. That is, conventionally known color correction processing (e.g., Unexamined Japanese Patent Publication No. Hei. 5-122513) involves the three steps of: expanding the amount of data in the high density region by subjecting original data to luminance data conversion processing using a logarithmic conversion curve; color-correcting the thus processed data using a 3×3 matrix filter; and correcting the gray density of the thus corrected data. However, when the gray density correction using the γ calibration data is performed first as described above, particularly in the case of a system using a printing device whose input/output characteristic is noticeably nonlinear (e.g., an ink jet printer), the γ calibration data has a conversion characteristic that is extremely close to the aforementioned logarithmic conversion curve. Therefore, only the gray density correction is enough to obtain the same effect as that provided by executing both the conventional luminance conversion processing and the gray density correction processing concurrently. Therefore, satisfactory gray density and color reproduction that are substantially equivalent to that obtained by the conventional three-step processing can be obtained by the two step processing involving the gray density correction using the γ calibration data and the color correction processing using the 3'3 matrix filter.

In the case of calibrating the γ calibration data, if the read sample data is subjected to normalization processing that is designed to expand the gray density distribution range toward the high density side, then a dynamic range in the high density region in a reproduced image obtained by printing out the printing data is expanded, so that a reproduced image having a satisfactory appearance can be obtained.

In the case of calculating the γ calibration data, if the steps of: first detecting a point of change in the density value by scanning the gray density values of read sample data; then preparing conversion data for converting the gray density values of the read sample data at the detected point of change into the gray density values of the corresponding chart file data; and making the prepared conversion data the γ calibration data, are performed, then this processing can actually be executed by such a simple operation as to reference the read sample data and the chart file stored in memory.

In calculating the color calibration data, if only color data in the chart file corresponding to colors within the range of colors that can be outputted by the printing device is sampled and calculated, then gray density and color reproduction for half tone colors that can be outputted by the printing device improves, which in turn allows ordinary photographs consisting of many half tone colors to be reproduced faithfully. On the other hand, in the case of using data corresponding to colors outside the range of colors that can be outputted by the printing device by means of sampling, then the colors are corrected so as to be close to the primary colors. Therefore, this subsystem is suitably applied to cases where original images using many primary colors such as posters are to be reproduced clearly.

In the case of using a 3×3 matrix filter as the color calibration data, if such normalization processing as to make the lightness components of the matrix filter equal to one another for the three colors is executed, then an advantage that gray balance is not lost in color correction can be obtained.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings:

FIG. 5 is a diagram of a γ calibration chart in the sample chart;

FIG. 6 is a diagram of a color calibration chart in the sample chart;

FIG. 11 is a diagram showing exemplary data interpolation based on a linear interpolation method effected during the γ cure table calculation process;

FIG. 13 is a table of read data and a table of chart file data after the read data and the chart file data have been subjected to normalization processing, the tables being developed in a main memory;

FIG. 14 is a calibration γ curve table;

FIG. 16 is a flowchart showing a flow of the process for calculating the color correction coefficient.

DETAILED DESCRIPTION OF THE PREFERRED EMBODIMENTS

Figure 1:
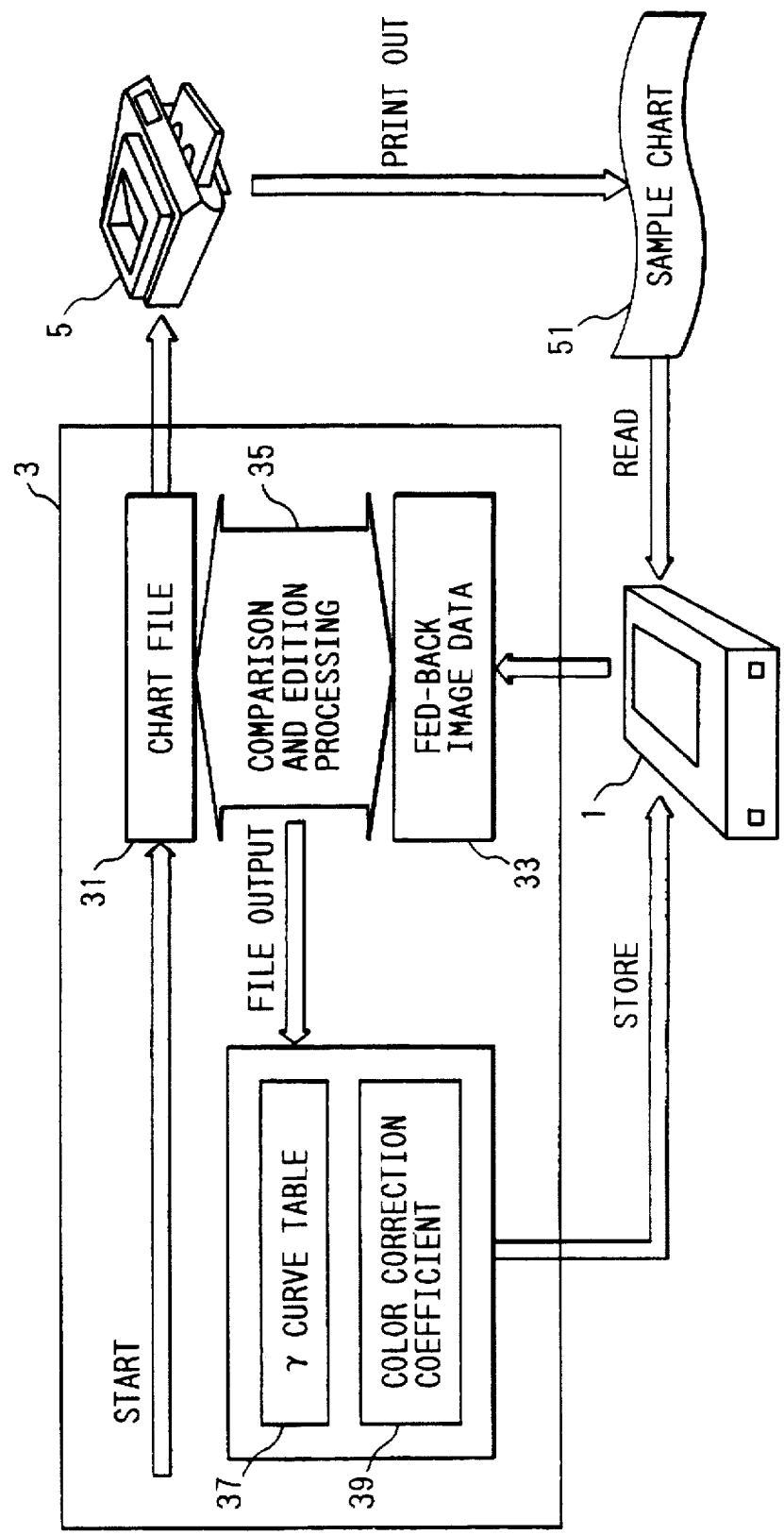
FIG. 1 is a block diagram of a color image processing system to which a data correction subsystem of the invention is applied.

FIG. 1 shows an exemplary configuration of a color image processing system to which a data correction subsystem of the invention is applied.

As shown in FIG. 1, this system includes an image scanner 1, a host computer 3, and a color printer 5. The image scanner 1 has the basic function of reading an original color image to produce image data, and sending the image data to the host computer 3. The host computer 3 has the basic function of performing various operations corresponding to business applications with respect to the image data received from the image scanner 1 and outputting the thus processed image data to the color printer 5. The color printer 5 has the function of printing out a reproduced color image based on the image data from the host compute 3.

In addition to the aforementioned basic functions, the image scanner 1 and the host computer 3 have some other functions including that of correcting the image data to improve reproduction of the gray density and color of the original image. The correction operation (hereinafter referred to as "calibration") will be described in detail below.

The calibration operation is roughly divided into two phases. The first phase, although somewhat preliminary, forms the main part of the operation. In the first phase (hereinafter referred to as "file preparation phase"), a γ curve table and a color correction coefficient (a matrix filter), which are basic correction data, are calculated to prepare files corresponding to these data and the prepared files are saved in the system. In the second phase (hereinafter referred to as "calibration execution phase"), a regular data calibration operation is performed while a business application is being executed, i.e., image data produced by the scanner 1 when the scanner 1 reads an image is subjected to correction using the saved γ curve table and color correction coefficient.

FIG. 1 also shows a general flow of the file preparation phase out of first and second phases. Further, FIG. 2 shows the processing flow thereof in the form of a flowchart.

Figure 2:
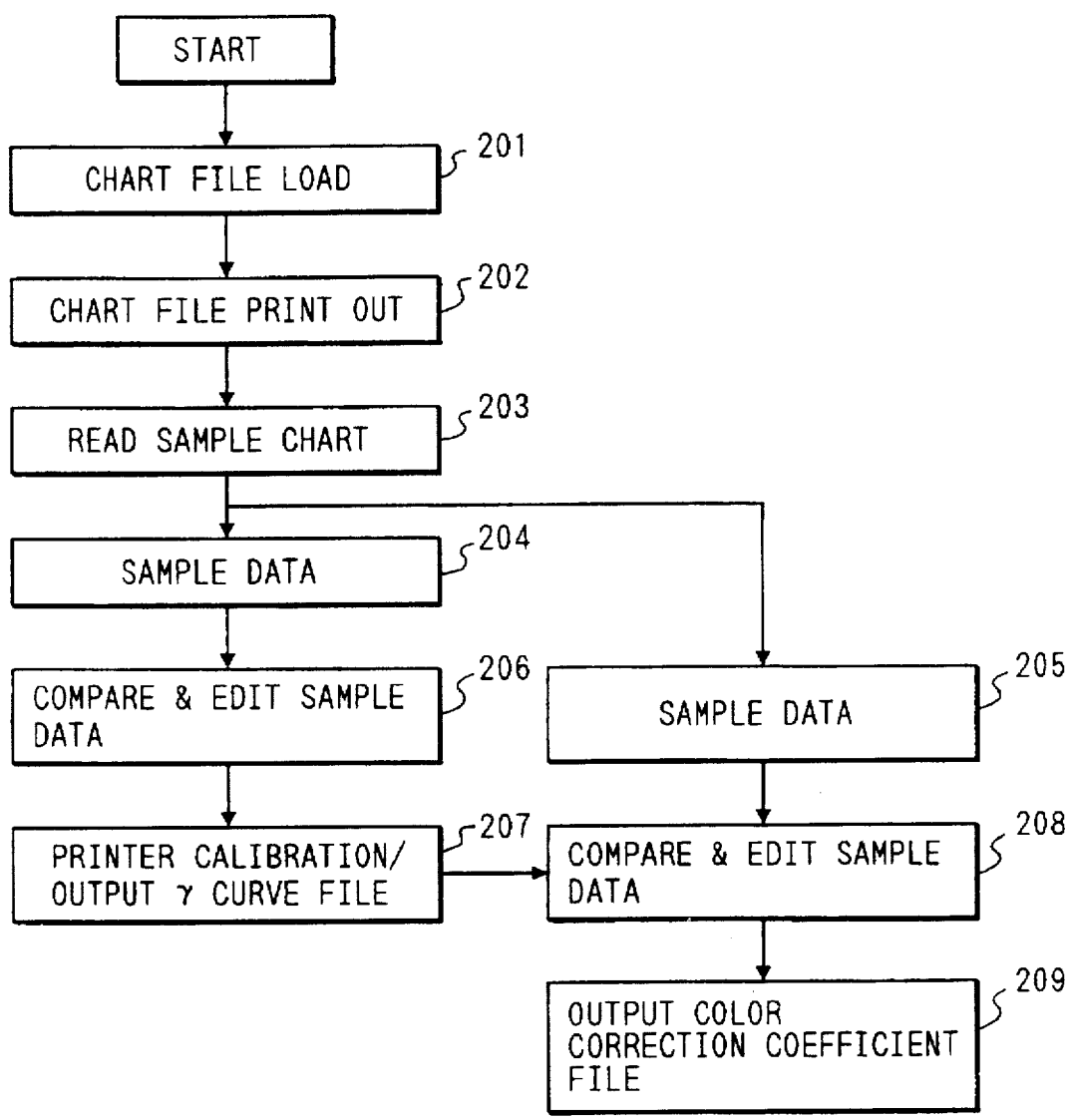
FIG. 2 is a flowchart of a file preparation process.

As shown in FIG. 2, the file preparation phase starts with such an operation that the host computer 3 first loads a prestored (or externally inputted) chart file 31 to the main storage thereof and then outputs the chart file 31 to the printer 5 (Step 201). This chart file is an image data file specially designed for calibration, and represents a sample chart 51 (see FIG. 4) arranging standard samples of various gray densities and various colors. The printer 5 prints out the sample chart 51 upon reception of the chart file 31 (Step 202). A printout of the sample chart 51 exhibits impairment of gray density and color reproduction attributable to a nonlinear input/output characteristic inherent in the printer 5.

Then, the sample chart 51 is read by the scanner 1 (Step 203), and the read image data is fed back to the host computer 3. The fed-back image data 33 reflects a modification of the data as a result of an input/output characteristic of the scanner 1 being superimposed upon the input/output characteristic of the printer 5. It may be noted that in reality, the input/output characteristic of the scanner 1 is almost linear, and therefore what is substantially exhibited in the fed-back image data 33 is affected by the nonlinear input/output characteristic of the printer 5 itself. Hence, the calibration for such image data will hereinafter be called the "printer calibration" in this sense.

Subsequently, a comparison/edition processing 35 is executed by the host computer 3. That is, predetermined typical data is sampled from the fed-back image data 33 (Steps 204, 205), the sampled data is compared with the corresponding data in the original chart data file 31 and edited (Steps 206, 208), and a γ curve table and a color correction coefficient are calculated to prepare files 37, 39 (hereinafter referred to as "γ curve file" and "color correction coefficient file", respectively) (Steps 207, 209). These files 37, 38 are not only saved in the host computer 3, but also are sent to the scanner 1. The scanner 1 saves both the γ curve file 37 and the color correction coefficient file 39. The file preparation phase is thus terminated.

The γ curve table is a data conversion table for performing the printer calibration operation with respect to gray density.

The color correction coefficient is a coefficient array consisting of a 3×3 dimensional matrix filter for performing the printer calibration operation with respect to color. These two data files 37, 39 will hereinafter be referred to collectively as "calibration data files". These calibration data files have calibration contents substantially amounting to an inverse function of the input/output characteristic of the printer 5.

Once the calibration data files 37, 39 have been saved in this way, the scanner 1 effects the calibration execution phase using these files 37, 39 every time the scanner 1 reads an image, and sends the calibrated image data to the host computer 3. As has already been described, the content of this calibration operation substantially amounts to the inverse function of the input/output characteristic of the printer 5. Therefore, by sending the calibrated image data to the printer 5 to cause the printer to make a printout of the calibrated image data, the input/output characteristic of the printer 5 and the calibration content cancel each other out, thereby allowing a reproduced image having satisfactory gray density and color reproduction to be printed out.

As described above, this system is designed to save the calibration data files 37, 39 in the scanner 1 and to cause the scanner 1 to execute the printer calibration processing. Therefore, the host computer 3 and the printer 5 have nothing to do with the calibration processing while they are executing a business application program. As a result, this system provides an advantage that the host computer 3 is free to change business application programs. Further, this system provides another advantage that the calibration processing is easily executed if the scanner 1 and the printer 5 are directly connected to each other to "emulate" a copying machine without interposing the host computer 3 therebetween. Still further, this system is ready to accommodate such possible needs as changing the type of the printer 5 or selecting a single printer out of a plurality of printers since the printer does not have to perform the printer calibration processing itself. It may be noted that further improved flexibility can be provided if calibration data files of all the types of printers that are possibly used are saved in the host computer 3 to allow the corresponding files to be loaded to the scanner 1 every time the printer type is changed, or if calibration data files of all the types of printers are saved in the scanner 1 in advance and the corresponding calibration data in the scanner 1 is specified and selected every time the printer type is changed.

A configuration of the scanner 1 of this system will be described next with reference to the block diagram of FIG. 3.

Figure 3:
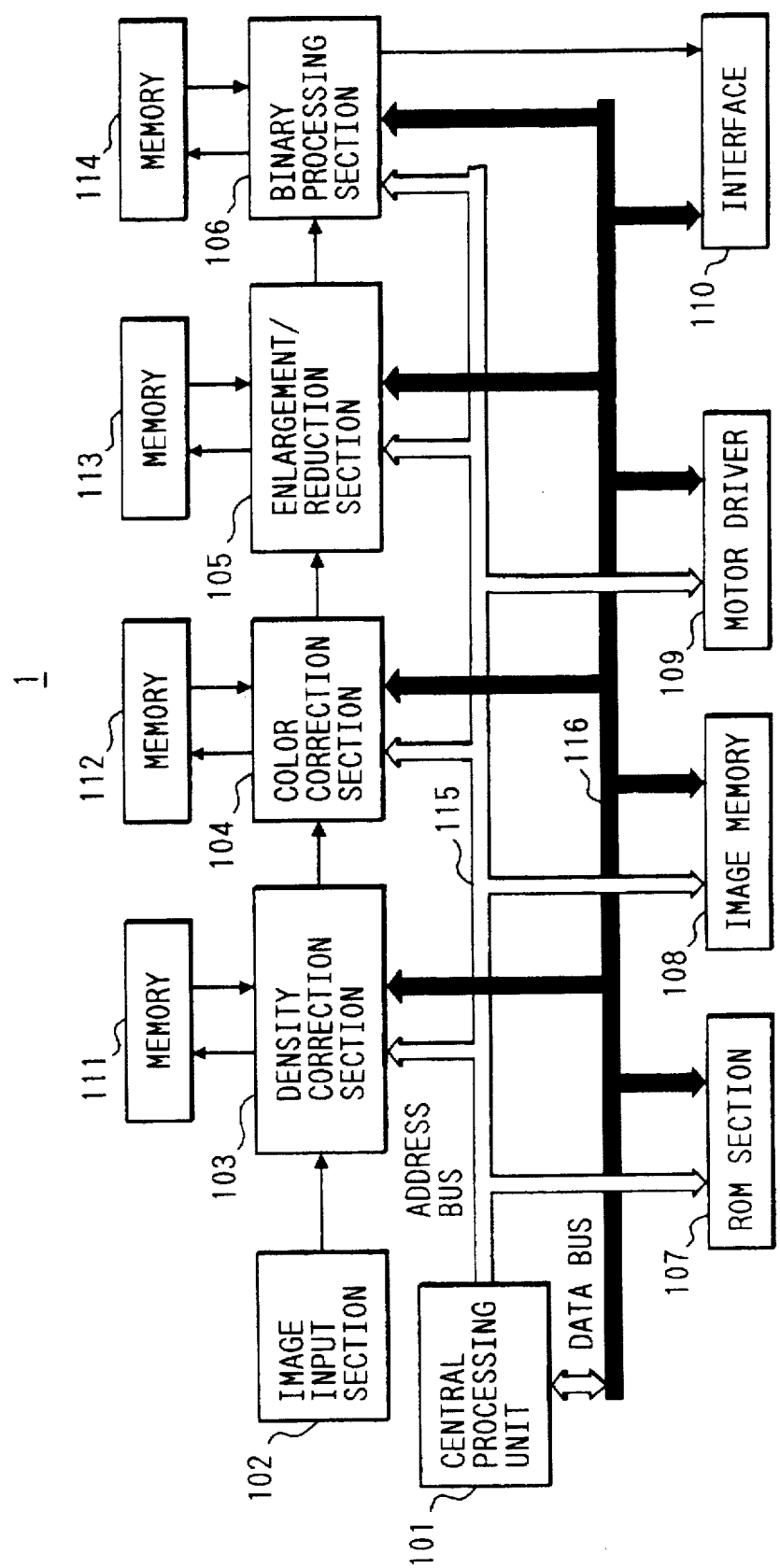
FIG. 3 is a block diagram of an image scanner.

As shown in FIG. 3, a central processing unit 101 controls the entire part of the scanner 1 through an address bus 115. A density correction section 103, a color correction section 104, an enlargement/reduction section 105, a binary processing section 106, a ROM section 107, an image memory 108, a motor driver 109, and an interface 110 are connected to the central processing unit 101 through the address bus 115 and a data bus 116.

An image input section 102 generates image data from an inputted image by color-separating the image into the three color components red (R), green (G), and blue (B), while irradiating a beam of light onto the image set to the scanner 1 and receiving reflected light at an optical sensor such as an array of CCDs.

The density correction section 103 receives the image data from the image input section 102 and subjects the received image data to density conversion. The density correction section 103 has a memory 111. The γ curve file sent from the host computer 3 through the interface 110 is saved in the memory 111. The density conversion processing is executed using the γ curve file.

The color correction section 104 receives the density-corrected image data and subjects the received image data to color correction. The color correction section has a memory 112. The color correction coefficient file sent from the host computer 3 through the interface 110 is saved in the memory 112. The color correction processing is executed using the color correction coefficient file.

The enlargement/reduction section 105 receives the color-corrected image data and subjects the received data to enlargement or reduction as the case may so require. Conversion data for executing this enlargement/reduction processing is stored in a memory 113.

The binary processing section 106 receives the image data from the enlargement/reduction section 105 (e.g., 24-bit data) and converts the received image data into data consisting of a smaller number of bits as the case may so require. Conversion data for executing this conversion processing is saved in a memory 114.

The ROM section 107 stores programs including timing data of the whole unit, data for operating the central processing unit 101 by processing commands inputted from the interface 110, and the like. These programs are necessary for operating the central processing unit 101.

The image memory 108 stores the image data processed by the density correction section 103, the color correction section 104, the enlargement/reduction section 105, and the binary processing section 106, and holds such data until such data are outputted from the interface 110.

The interface 110 is a communication interface with the host computer 3 and outputs image data, inputs commands, and inputs calibration data files, and the like.

The scanner 1, upon reading the sample chart 51 in the file preparation phase, sends the read image data to the host computer 3 through the interface 110 without performing the operations at the density correction section 103 and the color correction section 104. When the calibration data files 37, 39 have been sent from the host computer 3, the scanner 1 stores the γ curve file 37 in the memory 111 and the color correction coefficient file 39 in the memory 112.

On the other hand, in the calibration execution phase in which a business application is being executed, the scanner 1 subjects the read image data to processing at the density correction section 103 and the color correction section 104, and then either sends the thus processed image data to the host computer 3 or directly to the printers through the interface 110.

The foregoing is an overall description of the calibration operation performed by this system. The file preparation phase, which forms the main part of the calibration operation, will now be described in detail.

Figure 4:
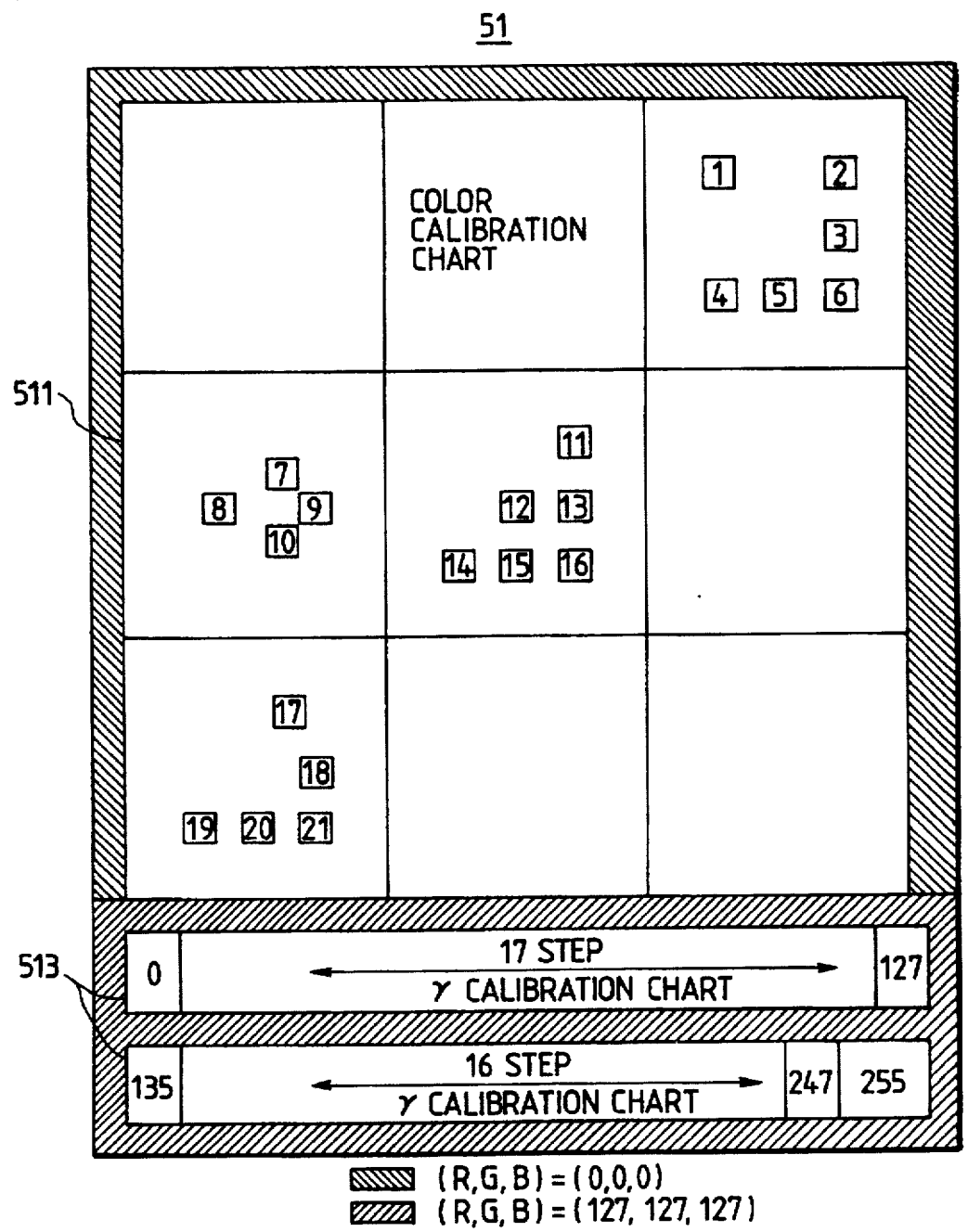
FIG. 4 is a diagram of a sample chart.

FIG. 4 shows a configuration of the sample chart 51 that is printed out by the printer at the initial stage of this phase. This chart 51 includes a color calibration chart 511 for calculating the color correction coefficient and a γ calibration chart (or also called "gray scale") 513 for calculating the γ curve table. As shown in FIG. 5, the γ calibration chart 513 is an array of rectangular regions (each being hereinafter referred to as "batch") extending in a single direction. These batches are printed in 33 tones (0, 7, 15, . . . , 239, 247, 255) selected from every 8 tones out of the total tone range (0 to 255) of gray, where the tones of R, G, and B are the same. It may be noted that this gray scale 513 is arranged in two rows to save space in the printed sample chart 51.

As shown in detail in FIG. 6, the color calibration chart 511 is divided into 9 large square regions, and each large square region is further divided into 81 small square regions (each small square region being hereinafter referred to as "batch"). In each of the 9 large square regions, the B component is changed in 9 tones every 32 tones (0, 31, . . ., 223, 255). In each large square region, the R component and the G component are also changed in 9 tones every 32 tones (0, 31, . . . , 223, 255) in the horizontal direction and in the vertical direction, respectively. Therefore, the color calibration chart 511 is constructed of a total of 729 color batches.

The thus constructed sample chart 51 is read by the scanner 1 to produce image data, and the image data is sent to the host computer 3. The host computer 3 calculates the γ curve table and the color correction coefficient from the image data. In this case, the γ curve table is calculated first, and the color correction coefficient is thereafter calculated.

The procedure for calculating the γ curve table will be described in detail below.

Figure 7:
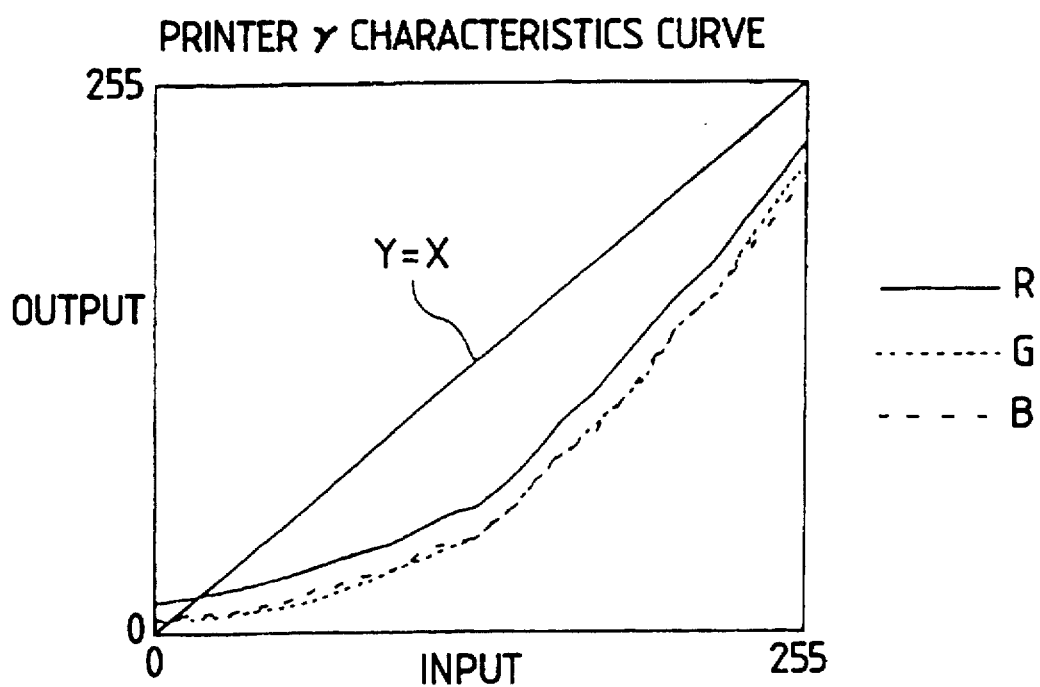
FIG. 7 is a diagram of an input/output characteristic of a printer.
Figure 8:
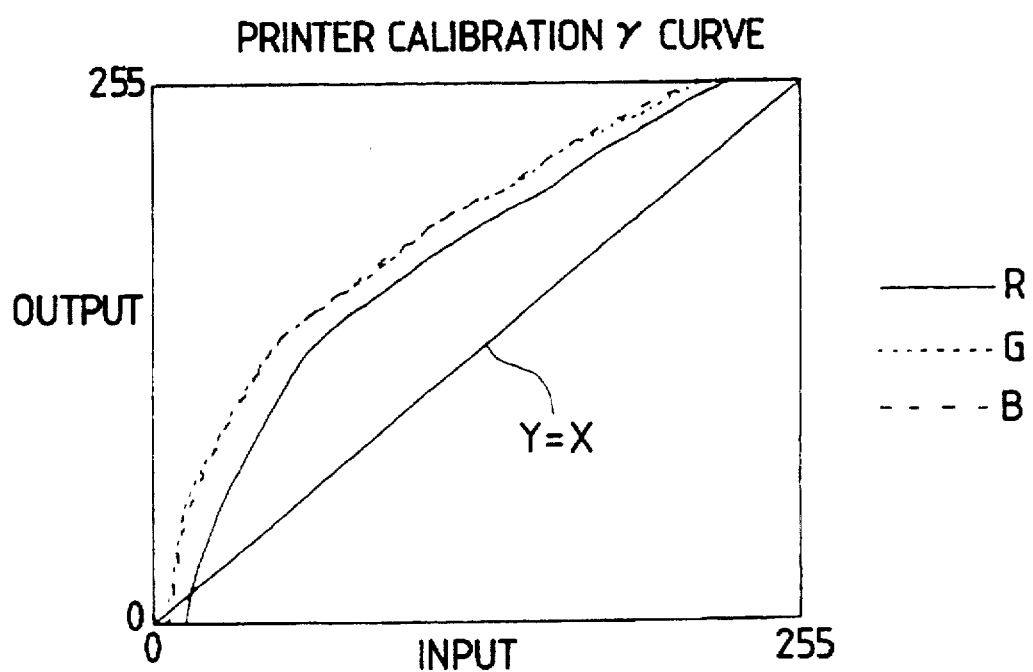
FIG. 8 is a diagram of a printer calibration γ curve (an inverse function of a printer γ characteristic curve of FIG. 7)

FIGS. 7 and 8 are physical representations of the curve table. FIG. 7 shows an input/output characteristic of the printer 5. While the input/output characteristic of the printer 5 more or less varies depending on the components R, G, B, there is a common tendency that the input/output characteristic of the printer 5 exhibits a nonlinear characteristic curving toward the low output side with respect to a linear characteristic (Y=X). This curve is generally called a γ characteristic curve.

To provide an ideal gray density reproduction of a printed-out reproduced image by having the γ characteristic curve of the printer 5 corrected by the scanner 1, what is required is only that the scanner 1 have a printer calibration γ curve such as shown in FIG. 8 (an inverse function of the printer γ characteristic curve shown in FIG. 7) as an input/output characteristic thereof. It is the γ curve table that intentionally imparts this printer calibration γ curve to the input/output characteristic of the scanner 1. That is, the γ curve table is a description of the correspondence between inputs and outputs as shown in FIG. 14.

Figure 9:
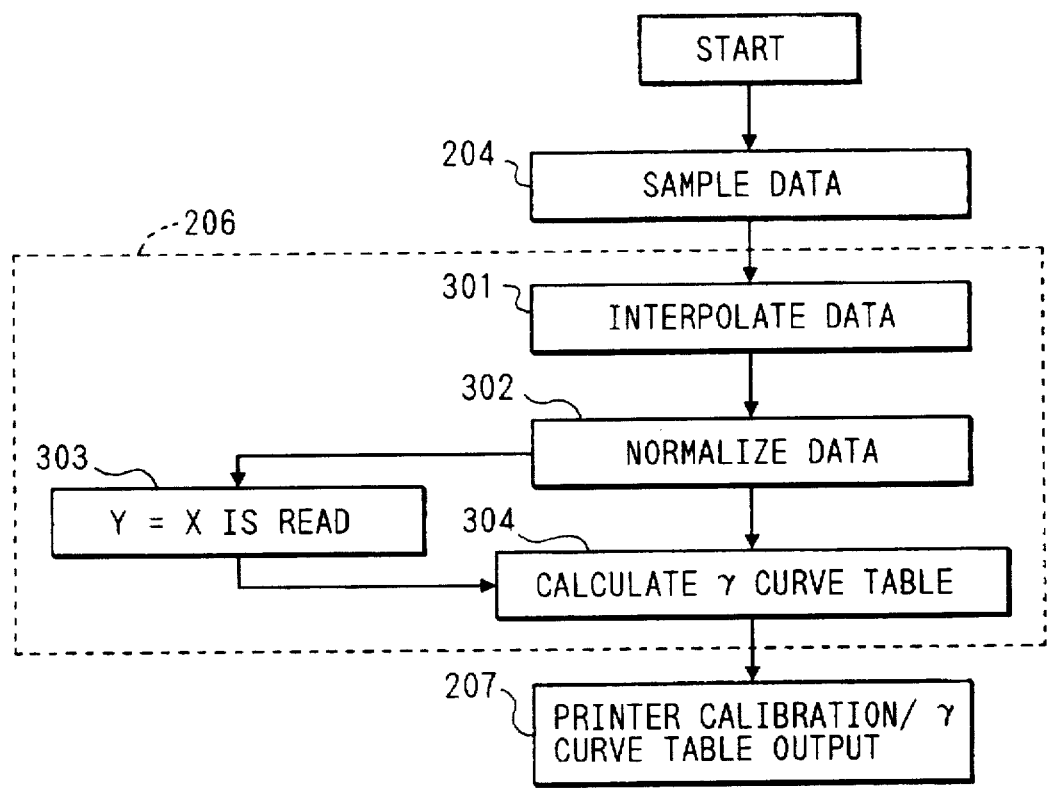
FIG. 9 is a flowchart of the process for calculating the printer calibration γ curve table.

FIG. 9 shows in detail a flow of the processing of calculating the printer calibration γ curve table to be executed by the host computer 3. It may be noted that in FIG. 9 the same steps as in the general flow shown in FIG. 2 are denoted by the same reference characters.

Figure 10:
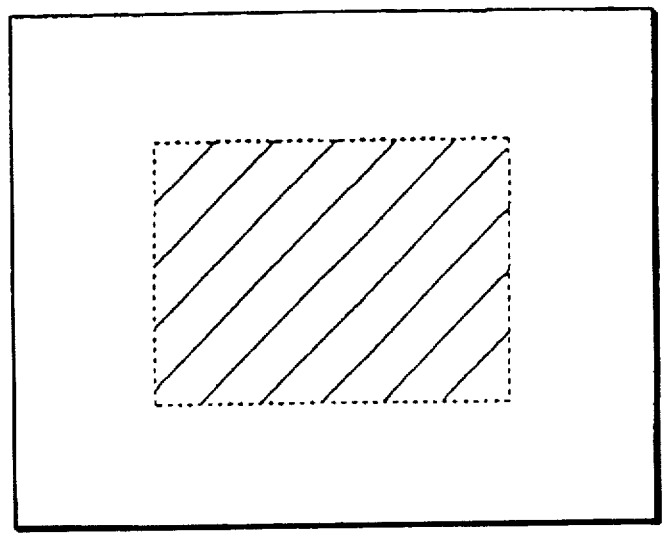
FIG. 10 is a diagram showing a position at which data is picked up from each batch of the sample chart.

First, data in the γ calibration chart 513 is sampled from the image data in the sample chart 51 inputted from the scanner 1 (Step 204). The term "sampling" is intended to mean that data in such a predetermined central region (the hatched region) as shown in FIG. 10 is picked up. As a result of this sampling operation, data for as much as 32 tones is obtained. Since data at each tone consists of the three components, R, G, B, a total of 99 pieces of data are obtained.

Then, final data for 256 tones is prepared by interpolating data between two adjacent pieces of data sampled every 8 tones (Step 301). The data interpolation can be carried out by an ordinary linear interpolation method. An example of how data interpolation is effected is shown in FIG. 11. As shown in FIG. 11, based on the RGB data of a sampled tone and that of the tone next to such sampled tone, the RGB data for 7 tones present between these two tones are calculated by the linear interpolation method. After the data for 256 tones has been obtained in this way, normalization processing with respect to the data for 256 tones is then executed (Step 302)

Figure 12:
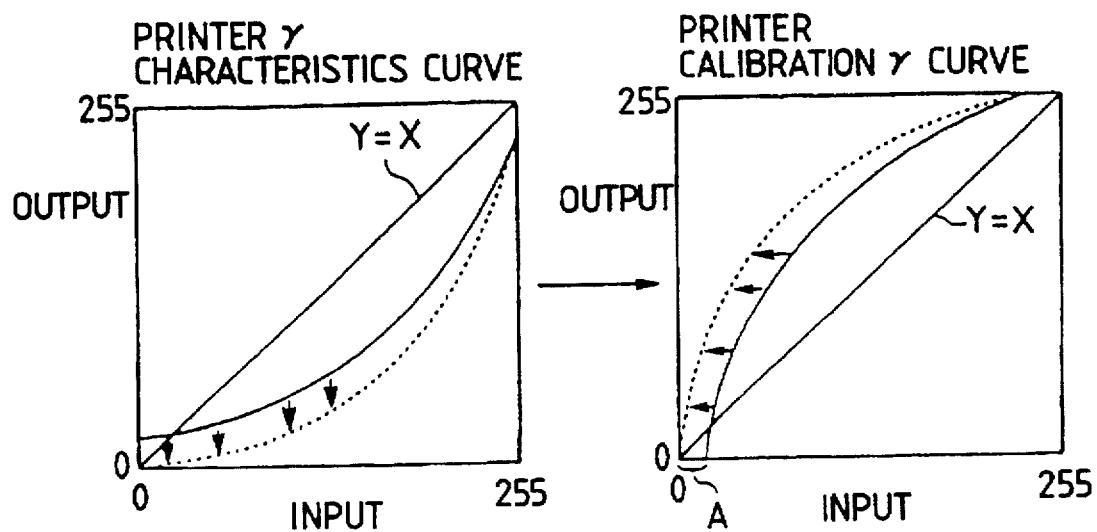
FIG. 12 is a physical representation of a normalization processing performed in the γ curve table calculation process.

FIG. 12 is a physical representation of this normalization processing. The curve indicated by the solid line on the left side graph of FIG. 12 represents the printer γ characteristic curve (the aforementioned data for 256 tones). One of the features of the γ characteristic curve is that tones close to tone 0 (pure black) and tones close to tone 256 (pure white) cannot be outputted. In other words, regions close to pure black and pure white cannot be printed. The normalization processing modifies the printer γ characteristic curve (the data for 256 tones) as if the region close to pure black within the regions that cannot be outputted could be outputted. That is, the curve indicated by the solid line on the left side graph of FIG. 12 is modified into a curve indicated by the broken line so as to expand toward the high density (black) side.

As a result of the modification made by the normalization processing, the finally obtained printer calibration γ curve becomes the curve indicated by the broken line on the right side graph of FIG. 12. If the normalization processing is not executed, the printer calibration γ curve becomes the curve indicated by the solid line on the right side graph of FIG. 12. This calibration γ curve indicated by the solid line means that black is outputted throughout a region A that is close to pure black. In contrast, the printer calibration γ curve indicated by the broken line on the right side graph of FIG. 12 obtained through the normalization processing gives output tones that change in accordance with input tones even in the input region A that is close to pure black. As a result, when the data thus calibrated by this γ curve indicated by the broken line on the right side graph of FIG. 12 is printed out by the printer, a change in tones close to pure black in an original image can be reproduced as a change in tones close to the black side edge within the printable tone range. That is, the dynamic range close to the pure black region can be ensured. Accordingly, an unnatural solid black region is no longer present in a reproduced image, thereby allowing a natural reproduced image to be obtained.

On the other hand, this normalization processing is not designed to ensure the dynamic range with respect to a region close to pure white in the printer γ characteristic curve, but to only leave such region as a region that cannot be outputted. The reason for this is that a region close to pure white, such as a highlighted portion in an original image, looks natural if left pure white (the background color of the sheet in actuality) in a reproduced image thereof and, if tones are given to such region (dotted in actuality), such region looks rather unnatural with the dots too conspicuous.

This normalization processing is executed using, e.g., the following operation expression for the respective RGB data:

$$X' = (X - Min) * (Max/(Max - Min))$$

where X' is the normalized data, X is the data before being normalized, Min is the minimum value of the data before being normalized, and Max is the maximum value of the data before being normalized.

After the normalization processing, the gray scale data in the chart file 31 (meaning the Y=X linear characteristic) is loaded to the main memory (Step 303), and the chart file data is referenced to the previously normalized read data so that a calibration γ table is prepared (Step 304).

FIGS. 13 and 14 show a specific example of the γ table preparation processing. FIG. 13 schematically shows a table of normalized read data and a table of chart file data (Y=X) in upper and lower sides, respectively, where both data are developed in the main memory.

The γ table preparation processing is designed to reverse the read data with Y=X as the central axis. A specific operation is as follows. Data in each column of a read data table shown in FIG. 13 is scanned in the order of tone and, upon change of the tone to a higher level, the column of the corresponding tone in the chart file table is referenced as shown by the arrow. The level of the tone in the read data table and the level of the tone in the referenced chart file table at the time are written as the input value and the output value to the calibration γ curve table such as shown in FIG. 14. This operation is continued until the read data table is scanned to the last column thereof. Accordingly, the calibration γ curve table shown in FIG. 14 can be prepared efficiently. This calibration γ curve table is not only saved in the host computer 3, but also sent to the scanner 1 so as to be saved in the memory 111 within the scanner 1.

The operation of calculating a color correction coefficient will be described next. The color correction coefficient is in the form of the following 3×3 matrix filter.

$$\begin{vmatrix} kr & kg & kb \\ lr & lg & lb \\ mr & mg & mb \end{vmatrix} \quad \text{[Eq. 1]}$$

Defining data before passing through this matrix filter as Rn, Gn, Bn and data after passing therethrough as Rm, Gm, Bm, then $$\begin{vmatrix} kr & kg & kb \\ lr & lg & lb \\ mr & mg & mb \end{vmatrix} * \begin{vmatrix} Rn \\ Gn \\ Bn \end{vmatrix} = \begin{vmatrix} Rm \\ Gm \\ Bm \end{vmatrix} \quad \text{[Eq. 2]}$$

is given.

Figure 15:
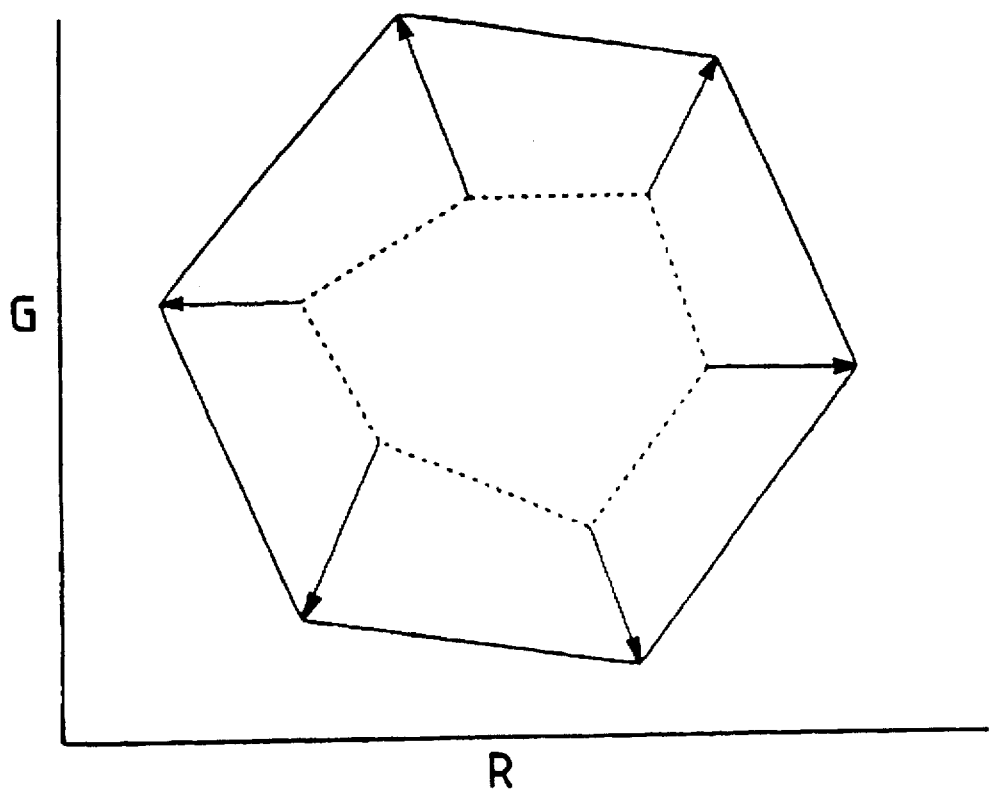
FIG. 15 is a physical representation of a color correction coefficient.

FIG. 15 is a physical representation of a color correction coefficient in this system. It may be noted that two color components, R and G, are indicated on a two-dimensional plane and the color component B is omitted to simplify FIG. 15. In FIG. 15, the solid line indicates data in the color calibration chart in the chart file 31, and the broken line indicates read data in the chart file 31 (i.e., data that has been modified by the input/output characteristic of the printer). The color correction coefficient is calculated so that the function of recovering the read data indicated by the broken line to the color calibration chart data indicated by the solid line can be performed. Therefore, when the scanner 1 calibrates the data obtained by reading an original image using this color correction coefficient, a reproduced image having colors of the original image extremely faithfully reproduced can be obtained with the effect of the calibration and the input/output characteristic of the printer cancelling out each other.

FIG. 16 shows a flow of the processing of calculating a color correction coefficient performed by the host computer 3. It may be noted that in FIG. 16, the same steps as those in FIG. 2 are denoted by the same reference characters.

In FIG. 16, the following data for 21 colors is first sampled from the data obtained by reading the color calibration chart 511 in the sample chart 51 (Step 205). It may be noted that the position of each batch of these 21 colors in the sample chart 51 is indicated in FIG. 4.

TABLE 1

|    | (R,   | G,   | B)  |
|----|-------|------|-----|
| 1. | (63,  | 63,  | 63) |
| 2. | (191, | 63,  | 63) |
| 3. | (191, | 127, | 63) |
| 4. | (63,  | 191, | 63) |
| 5. | (127, | 191, | 63) |

TABLE 1-continued

|     | (R,   | G,   | B)   |
|-----|-------|------|------|
| 6.  | (191, | 191, | 63)  |
| 7.  | (191, | 95,  | 95)  |
| 8.  | (127, | 127, | 95)  |
| 9.  | (223, | 127, | 95)  |
| 10. | (191, | 95,  | 95)  |
| 11. | (191, | 63,  | 127) |
| 12. | (127, | 127, | 127) |
| 13. | (191, | 127, | 127) |
| 14. | (63,  | 191, | 127) |
| 15. | (127, | 191, | 127) |
| 16. | (191, | 191, | 127) |
| 17. | (191, | 63,  | 191) |
| 18. | (191, | 127, | 191) |
| 19. | (63,  | 191, | 191) |
| 20. | (127, | 191, | 191) |
| 21. | (191, | 191, | 191) |

The feature common to these 21 colors is that the tones range from 63 to 191. This range is determined by referencing the aforementioned calibration γ curve table so as to be within the range of tones that can be outputted by the printer 5. That is, data is sampled from the range of tones that can be outputted by the printer. The reason therefor is to allow faithful color reproduction to be implemented within the range of tones that can be outputted by the printer. In other words, emphasis is placed on improving gray density and color reproduction of half tones, not the primary colors (which are out of the range of tones that can be outputted by the printer). As a result of this design, satisfactory gray density and color reproduction can be ensured for an original image such as an ordinary photograph in which there are many half tone colors.

On the other hand, with respect to an original image such as an artificially depicted poster using many primary colors, there is a demand that the primary colors be reproduced as clearly as possible. To meet such a demand, it is necessary that data be sampled from regions close to the primary colors which is out of the range of tones that can be outputted by the printer. Therefore, if a mode that performs the operation of sampling data from the range of tones that can be outputted by the printer is added to this embodiment, then two kinds of color correction coefficients which satisfy the aforementioned two demands can be obtained, and these color correction coefficients can be used in accordance with the application, thereby improving user-friendliness.

The aforementioned sampling operation extracts data only in the central portion of the batch shown in FIG. 10 out of the read data for the 21 colors. A total of 63 pieces of data are sampled since each of the 21 colors includes the 3 color components R, G, and B.

Then, the sampled read data is subjected to γ characteristic calibration using the previously obtained γ curve table (Steps 207, 401). A color correction coefficient is thereafter calculated from the γ-calibrated read data (Step 402). The color correction coefficient is calculated in the following way using the least-squares method so that error between the color calibration chart data in the chart file 31 and the corresponding read data is minimized.

If it is assumed that the read data for the 21 colors are defined as (Rgi, Ggi, Bgi) (i=1, . . . , 21) and that the corresponding data for the 21 colors in the chart file are defined as (Rsi, Gsi, Bsi) (i=1, . . . , 21), then the color correction coefficient is determined so that an average square error between both data for each of the R, G, B components, i.e., $$\sum_{i=1}^{21}(Rsi-Rgi)^2; \sum_{i=1}^{21}(Gsi-Ggi)^2; \sum_{i=1}^{21}(Bsi-Bgi)^2 \quad \text{[Eq. 3]}$$

is minimized.

The coefficient is determined by solving the following equation.

$$\begin{vmatrix} \Sigma(Rg^2) & \Sigma(RgGg) & \Sigma(RgBg) \\ \Sigma(RgGg) & \Sigma(Gg^2) & \Sigma(GgBg) \\ \Sigma(RgBg) & \Sigma(GgBg) & \Sigma(Bg^2) \end{vmatrix} * \quad \text{[Eq. 4]}$$

$$\begin{vmatrix} kr & lr & mr \\ kg & lg & mg \\ kb & lb & mb \end{vmatrix} = \begin{vmatrix} \Sigma(RsRg) & \Sigma(GsRg) & \Sigma(BsRg) \\ \Sigma(RsGg) & \Sigma(GsGg) & \Sigma(BsGg) \\ \Sigma(RsBg) & \Sigma(GsBg) & \Sigma(BsBg) \end{vmatrix}$$

where $\Sigma$ is the abbreviation of $$\sum_{}^{21}$$

and Rs, Gs, Bs, Rg, Gg, and Bg are the abbreviations of Rsi, Gsi, Bsi, Rgi, Ggi, and Bgi, respectively.

That is, the color correction coefficient can be calculated by executing the following arithmetic operation.

$$\begin{vmatrix} kr & kg & kb \\ lr & lg & lb \\ mr & mg & mb \end{vmatrix} = \left[ \begin{vmatrix} \Sigma(Rg^2) & \Sigma(RgGg) & \Sigma(RgBg) \\ \Sigma(RgGg) & \Sigma(Gg^2) & \Sigma(GgBg) \\ \Sigma(RgBg) & \Sigma(GgBg) & \Sigma(Bg^2) \end{vmatrix}^{-1} * \begin{vmatrix} \Sigma(RsRg) & \Sigma(GsRg) & \Sigma(BsRg) \\ \Sigma(RsGg) & \Sigma(GsGg) & \Sigma(BsGg) \\ \Sigma(RsBg) & \Sigma(GsBg) & \Sigma(BsBg) \end{vmatrix} \right]^T \quad \text{[Eq. 5]}$$

where "−1" is the inverse matrix and "T" is the transposed matrix.

The thus calculated color correction coefficient is called a temporary color correction coefficient. This temporary color correction coefficient is subjected to normalization processing (Step 403). The normalization processing modifies the temporary color correction coefficient so that the sum of each column (kr+kg+kb), (lr+lg+lb), (mr+mg+mb), which is the lightness component of the temporary color correction coefficient, becomes equal to one another (=1). More specifically, each of coefficients kr, kg, kb of the column k is divided by the sum of the column k (kr+kg+kb), each of coefficients lr, lg, lb of the column l is divided by the sum of the column l (lr+lg+lb), and each of coefficients mr, mg, mb of the column m is divided by the sum of the column m (mr+mg+mb).

This normalization processing provides an advantage that gray balance is not lost. That is, in the case where the read data indicating gray (R, G, B have the same tone) is multiplied by the color correction coefficient (see Eq. 2), if the temporary color correction coefficient is used without normalization, then the data after the multiplication is such that R, G, B have different tone levels since the sums of the respective columns (lightness component) are usually different from one another. This means that the read data after such multiplication exhibits a color other than gray (achromatic color). In contrast thereto, if the normalized color correction coefficient is used, the read data after multiplication exhibits gray since the sums of the respective columns are equal to 1, thereby allowing gray balance to be maintained. The thus normalized color correction coefficient is not only saved in the host computer 3 as the final color correction coefficient, but also sent to the scanner 1 to be saved in the memory 112 within the scanner 1.

While a preferred embodiment of the invention has been described above, the invention is not limited thereto, but may be embodied in various other modes without departing from the scope and spirit thereof. For example, the invention may be embodied in copying machines and facsimile communication systems.

As described in the foregoing, the invention is characterized as obtaining satisfactory gray density and color reproduction even if there is a discrepancy in input/output characteristic between an image reading device and a printing device in a color image processing system. In addition, once the calibration data has been obtained, a single autonomously functioning system can be formed only of the image reading device and the printing device themselves thereafter, which is highly useful as well as applicable to a variety of fields.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A data correction subsystem for a color image processing system having a color image reading device and a color image printing device, the data correction subsystem comprising:

transmitting means for transmitting a chart file to the printing device so that the printing device produces a sample chart;

calculation means for calculating γ and color calibration data from read sample data so that the read sample data can be corrected to corresponding data in the chart file, the read sample data being obtained by causing the reading device to read the sample chart, the calculation means including gray density normalization means for subjecting the read sample data to normalization processing to expand a gray density distribution region of the read sample data toward a higher density side; and calibration means for correcting printing data to be transmitted to the printing device using the γ and color calibration data.

2. The data correction subsystem according to claim 1, wherein the γ and color calibration data includes γ calibration data for correcting gray density and color calibration data for correcting a color, and the calibration means subjects the printing data first to gray density correction using the γ calibration data and then to color correction using the color calibration data.

3. The data correction subsystem according to claim 2, wherein the color calibration data is a 3×3 matrix filter by which three primary color components of the printing data are multiplied.

4. The data correction subsystem according to claim 1, wherein a plurality of different types of printing devices can be used selectively or concurrently as the printing device, and wherein the data correction subsystem further comprises:

γ and color calibration data storing means for storing γ and color calibration data calculated respectively for each of the plurality of types of printing devices; and γ and color calibration data selection means for selecting γ and color calibration data for a type of printing device to be used from the stored γ and color calibration data and for supplying the selected γ and color calibration data to the calibration means.

5. The data correction subsystem according to claim 1, wherein the γ and color calibration data includes γ calibration data for correcting a gray density, and wherein the calculation means comprises:

color sampling means for sampling only color data in the chart file from the read sample data, the color data corresponding to a predetermined color within a range of colors that can be outputted by the printing device; and conversion data calculation means for calculating conversion data for correcting the color data sampled from the read sample data to corresponding data in the chart file and making the conversion data the color calibration data.

6. The data correction subsystem according to claim 1, wherein the γ and color calibration data includes γ calibration data for correcting a color, and wherein the calculation means comprises:

color sampling means for sampling only color data in the chart file from the read sample data, the color data corresponding to a predetermined color outside a range of colors that can be outputted by the printing device; and conversion data calculation means for calculating conversion data for correcting the color data sampled from the read sample data to corresponding data in the chart file and making the conversion data the color calibration data.

7. A data correction subsystem for a color image processing system having a color image reading device and a color image printing device, the data correction subsystem, comprising:

transmitting means for transmitting a chart file to the printing device so that the printing device produces a sample chart;

calibration data calculation means for calculating calibration data from read sample data so that the read sample data can be corrected to corresponding data in the chart file, the read sample data being obtained by causing the reading device to read the sample chart; and calibration means for correcting printing data to be transmitted to the printing device using the calibration data;

wherein the calibration data includes γ calibration data for correcting a gray density, and wherein the calibration data calculation means comprises:

gray density normalization means for subjecting the read sample data to normalization processing to expand a gray density distribution region of the read sample data toward a higher density side; and conversion data calculation means for calculating conversion data for correcting a gray density of the normalized read sample data to a gray density of the chart file data and making the calculated conversion data the γ calibration data.

8. A data correction subsystem for a color image processing system having a color image reading device and a color image printing device, the data correction subsystem, comprising:

transmitting means for transmitting a chart file to the printing device so that the printing device produces a sample chart;

calibration data calculation means for calculating calibration data from read sample data so that the read sample data can be corrected to corresponding data in the chart file, the read sample data being obtained by causing the reading device to read the sample chart; and calibration means for correcting printing data to be transmitted to the printing device using the calibration data;

wherein the calibration data includes γ calibration data for correcting a gray density, and wherein the calibration data calculation means comprises:

density change detection means for detecting a point of change in a density value by scanning gray density values of the read sample data in a single direction; and conversion data preparation means for preparing conversion data for converting the gray density value of the read sample data at the detected point of change into a gray density value of the chart file data corresponding to the point of change and making the prepared conversion data the γ calibration data.

9. A data correction subsystem for a color image processing system having a color image reading device and a color image printing device, the data correction subsystem, comprising:

transmitting means for transmitting a chart file to the printing device so that the printing device produces a sample chart;

calibration data calculation means for calculating calibration data from read sample data so that the read sample data can be corrected to corresponding data in the chart file, the read sample data being obtained by causing the reading device to read the sample chart: and calibration means for correcting printing data to be transmitted to the printing device using the calibration data:

wherein the calibration data includes color calibration data for correcting a color, and wherein the calibration data calculation means comprises:

matrix filter calculation means for calculating a 3×3 matrix filter to minimize an error between three primary color component values of the read sample data and three primary color component values of the chart file data; and matrix normalization means for executing normalization processing to make lightness components with respect to the three primary colors of the calculated matrix filter equal to one another and making the thus normalized matrix filter the color calibration data.

10. A data correction method for a color image processing system having a color image reading device and a color image printing device, comprising the steps of:

transmitting a chart file to the priming device so that the priming device produces a sample chart;

calculating γ and color calibration data from read sample data so that the read sample data can be corrected to corresponding data in the chart file, the read sample data being obtained by causing the reading device to read the sample chart, the calculating γ and color calibration data including a gray density normalization step for subjecting the read sample data to normalization processing to expand a gray density distribution region of the read sample data toward a higher density side; and correcting priming data to be transmitted to the printing device using the γ and color calibration data.

11. A color image processing system, comprising:
a color image reading device;
a color image printing device;
transmitting means for transmitting a chart file to the printing device so that the printing device produces a sample chart;
calculation means for calculating γ and color calibration data from read sample data so that the read sample data can be corrected to corresponding data in the chart file, the read sample data being obtained by causing the reading device to read the sample chart, the calculation means including gray density normalization means for subjecting the read sample data to normalization processing to expand a gray density distribution region of the read sample data toward a higher density side; and
calibration means for correcting printing data to be transmitted to the printing device using the γ and color calibration data.

12. The color image processing system according to claim 11, wherein the color image reading device comprises a calibration data storage means for storing the γ and color calibration data obtained by the calculation means, and wherein the calibration means is provided in the color image reading device.

13. A data correction subsystem for an image processing system having an image reading device and an image printing device, the data correction subsystem comprising:
means for transmitting a chart file to the printing device such that the printing device produces a sample chart;
means for comparing first image data with the chart file, the first image data being produced by the image reading device upon a reading of the sample chart by the image reading device;
means for calculating γ calibration data for correcting gray density and color calibration data for correcting a color in accordance with the comparison of the first image data with the chart file; and
means for transmitting the γ calibration data and the color calibration data to the image reading device so that second image data produced by the image reading device upon a reading of an image by the image reading device is corrected in accordance with the γ and color calibration data.

14. A data correction method for an image processing system having an image reading device and an image printing device, the data correction method comprising the steps of:
transmitting a chart file to the printing device such that the printing device produces a sample chart;
comparing first image data with the chart file, the first image data being produced by the image reading device upon a reading of the sample chart by the image reading device;
calculating γ calibration data for correcting gray density and color calibration data for correcting a color in accordance with the comparison of the first image data with the chart file; and
transmitting the γ calibration data and the color calibration data to the image reading device so that second image data produced by the image reading device upon a reading of an image by the image reading device is corrected in accordance with the γ and color calibration data.

15. An image processing system, comprising:
an image reading device;
a color image printing device; and
a data correction subsystem, the data correction subsystem including
means for transmitting a chart file to the printing device such that the printing device produces a sample chart,
means for comparing first image data with the chart file, the first image data being produced by the image reading device upon a reading of the sample chart by the image reading device,
means for calculating γ calibration data for correcting gray density and color calibration data for correcting a color in accordance with the comparison of the first image data with the chart file, the calculation means including gray density normalization means for subjecting the read sample data to normalization processing to expand a gray density distribution region of the read sample data toward a higher density side, and
means for transmitting the calibration data to image reading device so that second image data produced by the image reading device upon a reading of an image by the image reading device is corrected in accordance with the γ and color calibration data.

16. An image processing method, comprising the steps of:
printing a sample chart in accordance with a chart file;
reading the chart file to produce first image data;
comparing the first image data with the chart file;
calculating γ calibration data for correcting gray density and color calibration data for correcting color in accordance with the comparison of the first image data with the chart file, the calculating γ calibration data including a gray density normalization step for subjecting the first image data to normalization processing to expand a gray density distribution region of the read sample data toward a higher density side;
transmitting the γ calibration data and the color calibration data to correct image data;
reading an image to produce second image data; and
correcting the second image data in accordance with the γ and color calibration data.

17. The image processing method according to claim 16, wherein the step of correcting the second image data includes the steps of correcting a gray density of the second image data in accordance with the γ calibration data and correcting a color of the second image data in accordance with the color calibration data.

18. The image processing method according to claim 16, wherein the printing step, the first reading step, the comparing step, and the calculating step are performed a plurality of times to produce γ and color calibration data for a plurality of corresponding printing devices, and wherein the method further comprises the step of storing the γ and color calibration data for at least one of the plurality of printing devices.

* * * * *